United States Patent [19]

Bachelder

[11] Patent Number: 5,361,579
[45] Date of Patent: Nov. 8, 1994

[54] TURBOJET FUEL CONTROL SYSTEM

[75] Inventor: Donald M. Bachelder, San Diego, Calif.

[73] Assignee: Sundstrand Corporation, Rockford, Ill.

[21] Appl. No.: 68,797

[22] Filed: Jun. 1, 1993

[51] Int. Cl.⁵ .............................. F02C 9/28
[52] U.S. Cl. ................................ 60/39.281
[58] Field of Search ............... 60/39.281, 243

[56] References Cited

U.S. PATENT DOCUMENTS

| | | |
|---|---|---|
| 3,956,884 | 5/1976 | Eves . |
| 4,423,592 | 1/1984 | Evans . |
| 4,423,593 | 1/1984 | Zagranski et al. ............ 60/39.281 |
| 4,432,201 | 2/1984 | Hawes . |
| 4,470,118 | 9/1984 | Morrison ..................... 60/39.281 |
| 4,517,797 | 5/1985 | Adachi . |
| 4,995,232 | 2/1991 | Sutton . |
| 5,029,441 | 7/1991 | Parsons ....................... 60/39.281 |
| 5,083,277 | 1/1992 | Shutler . |

OTHER PUBLICATIONS

Fink, Donald G. *Electronic Engineer's Handbook* McGraw-Hill, New York, 1975. pp. 24-14 & 24-15.

Primary Examiner—Louis J. Casaregola
Attorney, Agent, or Firm—Wood, Phillips, VanSanten, Hoffman & Ertel

[57] ABSTRACT

The problem of controlling fuel flow rate to a turbojet engine (14) is solved using a fuel control system (12). The fuel control system (12) uses an acceleration control function (66) receiving an acceleration setpoint signal (82) and an acceleration feedforward signal (90). A summer (92) calculates a difference between these two signals to develop an acceleration error signal (94) which is input to a proportional integral control (96) to develop a control signal (46) for controlling a fuel servo valve (44).

2 Claims, 2 Drawing Sheets

TURBOJET FUEL CONTROL SYSTEM

FIELD OF THE INVENTION

This invention relates to turbojet engine systems and, more particularly, to a fuel control system therefor.

BACKGROUND OF THE INVENTION

With the advent of digital control technologies, aircraft system designers have a greater potential than ever before to link the aircraft and its engine to achieve revolutionary new capabilities for high performance aircraft. A critical aspect of aircraft systems design when utilizing jet power is the ability to throttle a turbojet engine very rapidly, while minimizing the risk of timeout.

Fuel control systems for a typical small expendable turbojet engine control fuel flow rate to control engine speed. The system controls speed based on an error signal calculated as a difference between desired and actual engine speed. With such a control system, a fuel servo valve must be custom calibrated for each engine to deliver the corresponding fuel flow for a given current command from the control system. Even after calibrating the fuel servo, the effect of fuel type and temperature and fuel flow rate must be compensated for when incorporating the fuel limits imposed by the control system. Certain consequences result from the above conditions. First, a custom servo calibration for each engine and its software becomes expensive. Secondly, after providing adequate safety margin into hard fuel limits over the operational range of the engine, the acceleration capability of the turbojet can be cut by more than eighty percent. If this safety margin is neglected, the engine risks a flameout at some operational point.

In addition to controlling engines with the above in mind, most fuel control systems use constant proportional and integral gains on the speed error in the formulation of the command to the fuel servo. In response to a stepped command to increase engine speed, the fuel servo position will change according to its time constant, and the gain settings of the speed controller. If a fuel limit is exceeded, unburned fuel will mix with burned products, producing a temperature drop across the turbine, preventing acceleration to its full potential. If fuel flow rate is increased further, the fuel/air ratio can exceed the rich limit capability of the combustor, and the flame is self extinguished. When a decrease in speed is commanded of the engine, the fuel servo responds in a similar manner as above for the positive step command. The major difference lies in the foresight of the controller being capable of recognizing a critical flame stability issue. When operating in the lean region, there is no warning that the flame will be lost. With small turbojet engines there is typically no restart capability.

The present invention is directed to solving one or more of the problems above.

SUMMARY OF THE INVENTION

In accordance with the invention there is provided a fuel control system which controls in accordance with an acceleration error signal.

Broadly, there is disclosed herein an improved fuel control system in a turbojet engine system including a turbojet engine driven by combustion of fuel supplied from a fuel supply, a fuel servo valve disposed between the turbojet engine and the fuel supply and driven by a control signal for controlling combustion, and a sensor for sensing engine speed. The control system includes set point means for developing an acceleration set point signal, the acceleration set point signal representing desired engine acceleration. A first feedforward means is operatively coupled to the sensor for developing a speed feedforward signal representing actual engine speed. A second feedforward means is operatively coupled to the first feedforward means for developing an acceleration feedforward signal as a function of the speed feedforward signal and representing actual engine acceleration. A summing means is coupled to the setpoint means and the second feedforward means for calculating an acceleration error signal representing a difference between desired engine acceleration and actual engine acceleration. A control means is operatively coupled to the summing means for directly developing the control signal to control combustion to minimize the acceleration error signal.

It is a feature of the invention that the control means implements a proportional and integral control algorithm in accordance with adaptive engine gains to minimize the acceleration error signal. The acceleration and deceleration limit of the engine is also characterized to account for operation at various engine speeds, ambient temperatures and pressures.

There is disclosed in accordance with another aspect of the invention an engine control system comprising a fuel valve disposed between the engine and a fuel supply and driven by a control signal for controlling combustion in the engine. A sensor senses engine speed. A command means develops a speed setpoint signal, the speed setpoint signal representing desired engine speed. First feedforward means are operatively coupled to the sensor for developing a speed feedforward signal representing actual engine speed. First summing means are coupled to the command means and the first feedforward means for calculating a speed error signal representing a difference between desired engine speed and actual engine speed. Setpoint means are coupled to the first summing means for developing an acceleration setpoint signal as a function of the speed error signal, the acceleration setpoint signal representing desired engine acceleration to minimize the speed error signal. Second feedforward means are operatively coupled to the first feedforward means for developing an acceleration feedforward signal as a function of the speed feedforward signal and representing actual engine acceleration. Second summing means are coupled to the setpoint means and the feedforward means for calculating an acceleration error signal representing difference between desired engine acceleration and actual engine acceleration. Control means are operatively coupled to the second summing means and the servo valve for developing the control signal to control combustion to minimize the acceleration error signal.

It is a feature of the invention to provide a digital processing system operating in accordance with a control program, the processing system implementing the functions of the first and second feedforward means, the first and second summing means, the setpoint means and the control means.

There is disclosed in accordance with a further aspect of the invention an engine fuel control system comprising a fuel servo valve disposed between the engine and a fuel supply and driven by a control signal for controlling combustion in the engine. A sensor senses engine speed. A first control function includes command means for developing a speed setpoint signal, the speed setpoint signal representing desired engine speed. First feedforward means are operatively coupled to the sensor for developing a speed feedforward signal representing actual engine speed. First control means are coupled to the demand means and the first feedforward means for developing an acceleration setpoint signal as a function of a difference between the speed setpoint and the speed feedforward signal, the acceleration setpoint signal representing a desired engine acceleration to minimize such difference. An acceleration control function includes second feedforward means operatively coupled to the first feedforward means for developing an acceleration feedforward signal as a function of the speed feedforward signal and representing actual engine acceleration. Summing means are coupled to the first control means and the second feedforward means for calculating an acceleration error signal representing a difference between desired engine acceleration and actual engine acceleration. Second control means are operatively coupled to the summing means for developing a control output. An output circuit is driven by the control output of the acceleration control function to develop the control signal to control combustion to minimize the acceleration error signal.

It is a feature of the invention to provide a digital processing system operating in accordance with a control program, the processing system implementing the first control function and the acceleration control function.

The disclosed invention relates to a fuel control system for providing robust and optimal throttling capability of small turbojet engines. The control uses acceleration control for controlling engine fuel flow rate. The control produces an actual acceleration signal by differentiating a signal from a speed transducer. This is compared to a desired acceleration signal to provide an acceleration error signal used by a proportional and integral control for controlling fuel flow rate.

Further features and advantages of the invention will be readily apparent from the specification and from the drawing.

DETAILED DESCRIPTION OF THE INVENTION

Figure 1:
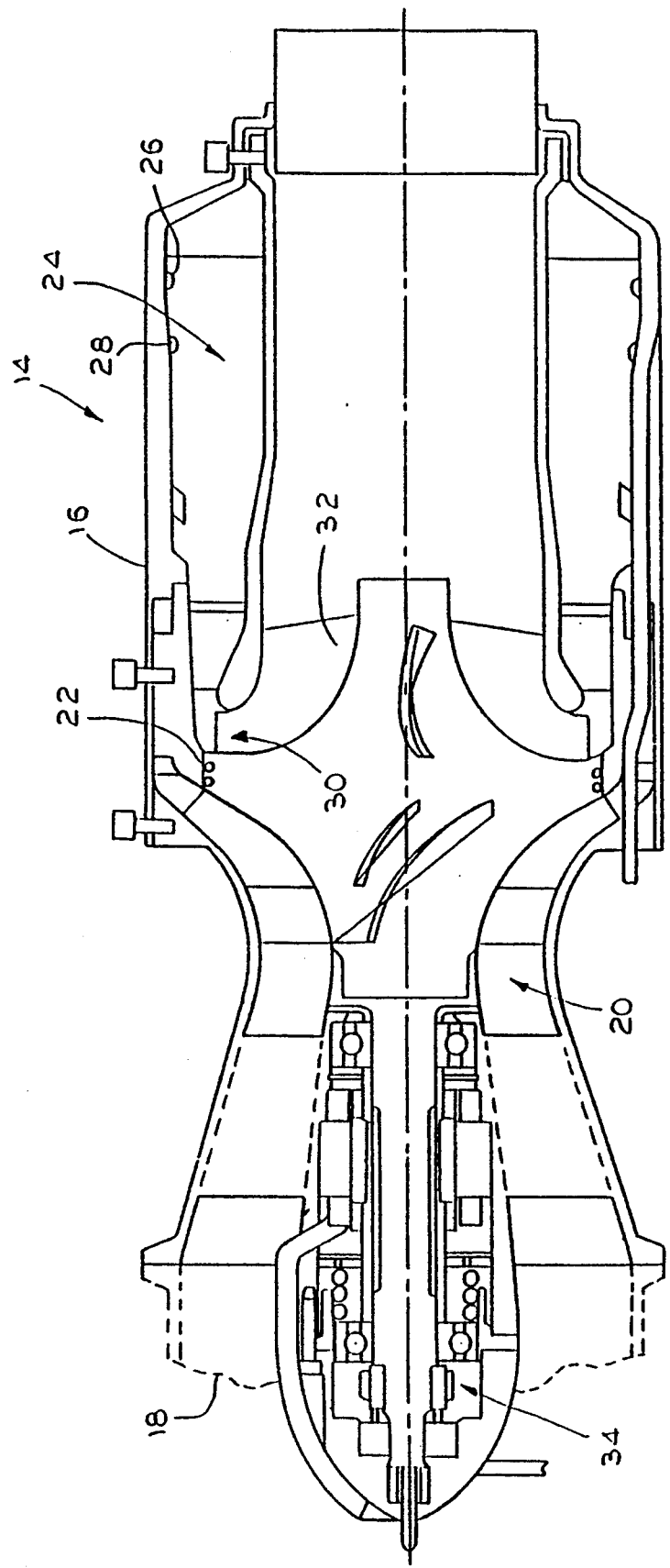
FIG. 1 is a cutaway view of a small turbojet engine.

With reference to the drawings, the reference numeral 10 designates a turbine engine system including a fuel control system 12 for controlling operation of a turbojet engine 14.

With reference to FIG. 1, the turbojet engine 14 comprises a small thrust engine having a housing 16. Air enters the housing 16 at an inlet 18 where it is inlet to a compressor 20 which receives and compresses the air at a pressure ratio of 4.5 to 1. The compressed air passes through a set of diffuser veins 22 which lowers the dynamic head and adds a 45° swirl angle to the air flow. The high swirl air then passes through an outer annulus of an annular combustor 24 via primary holes 26 and secondary holes 28. Combustion takes please within the annular combustor 24 with hot combustion gases mixing tangentially with dilution air. The turbine inlet gases are turned by a turbine nozzle 30 and impinge on a radial turbine wheel 32.

In the illustrated embodiment, the engine 14 is a 90 lbf thrust engine. In addition to providing thrust, the turbine 32 also drives a permanent magnet generator 34.

Figure 2:
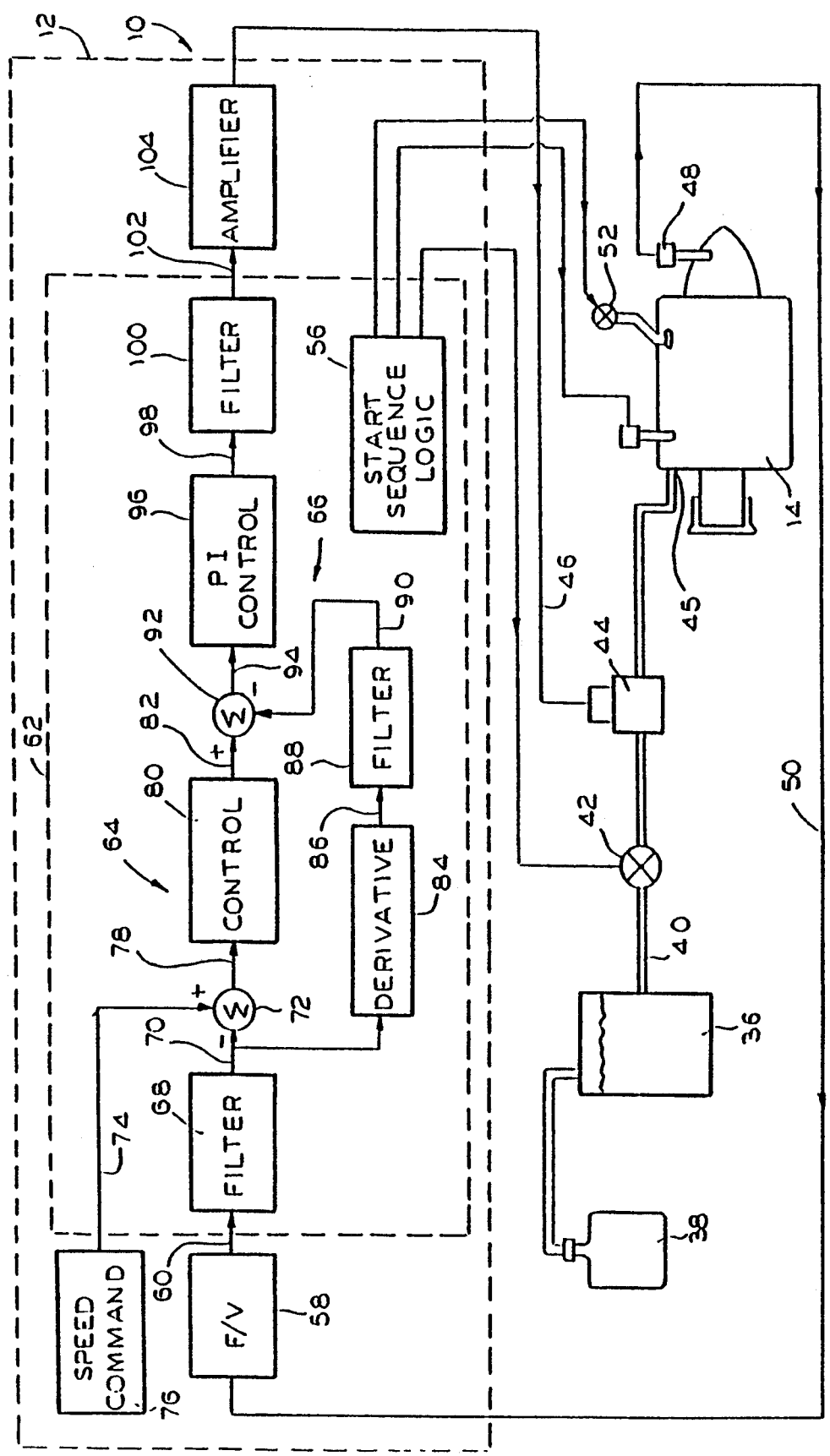
FIG. 2 is a generalized diagrammatic/block diagram illustration of the fuel control system according to the invention for controlling the small turbojet engine of FIG. 1.

With reference to FIG. 2, the turbojet engine 14 is driven by combustion of fuel supplied from a fuel supply 36 and associated fuel boost pressure device 38 for providing pressurized fuel to a line 40. A fuel shutoff valve 42 and fuel servo valve 44 are disposed between the fuel supply 36 and a fuel manifold 46 on the engine 14. Although not specifically shown, the engine 14 includes fuel injecting means for injecting fuel from the supply 36 into the annular combustor 24. Since the particular form of the injection means is well within the capability of those skilled in the art, it need not be described in detail herein.

The fuel servo valve 44 is controlled in accordance with a fuel servo current command or control signal on a line 46 for determining fuel flow rate. The command signal on the line 46 is developed by the fuel control system 12, as described below. Engine speed is sensed by a speed sensor 48 which may comprise a magnetic pickup speed transducer for developing a pulse signal having a frequency varying with engine speed. The speed signal is fed back on a line 50 to the fuel control system 12. In addition to the above, the engine system 10 includes an air impingement solenoid 52 and an exciter 54 associated with the permanent magnet generator 34. Both the solenoid 52 and exciter 54, as well as the fuel shutoff valve 42, are controlled by start sequence logic, represented by a block 56, associated with the fuel control system 12. However, the start sequence logic may take any known form, as will be apparent to those skilled in the art, and is therefore not described in detail herein.

The present invention relates particularly to the aspects of the fuel control system 12 which develop the fuel servo command on the line 46 to control fuel flow rate to the engine 14.

The frequency signal on the line 50 is received by a frequency to voltage converter 58 in the fuel control system 12. The frequency to voltage converter 58 comprises an analog circuit which converts the varying frequency signal to a zero to ten volt analog signal on a line 60. The signal on the line 60 is input to a digital processing circuit 62. The digital processing circuit 62 may be any conventional type processing circuit including a central processing unit and associated memory which is operated in accordance with a control program. An exemplary implementation of a control program is illustrated in block diagram form in the drawing and is described in greater detail herein.

As described the processing system 62 is a digital control system. The control application program comprises a sequence of instructions which define system operation. The block diagram illustration provides a functional representation of an acceptable program. The block diagram is described as passing "signals" between blocks. It should be understood that a digital system does not per se pass signals. Instead the term signal is intended to functionally describe information transferred from one functional block to another. In fact, the control system 12 could also be implemented in an analog system in which functional blocks represent actual circuit elements.

The digital processing system 62 implements a first control function 64 for developing an acceleration setpoint and an acceleration control function 66. The first control function 64 includes a filter block 68 which receives the speed signal on the line 60. A filtered speed feedforward signal on a line 70 is applied to a first summer 72. The summer 72 also receives a speed command signal on a line 74. The speed command signal on the line 74 is developed by a speed command block 76 which may comprise an engine throttle or any conventional device or software implementation for developing a speed command. The first summer 72 calculates a speed error signal on a line 78 representing a difference between desired engine speed and actual engine speed. The speed error signal on the line 78 is applied to a control block 80 which develops an acceleration setpoint signal on a line 82 representing desired engine acceleration to minimize the speed error signal on the line 78.

The acceleration setpoint signal is determined so that if there is no speed error, there should be no acceleration. The control 80 may use any conventional algorithm for calculating an acceleration setpoint signal.

Small turbojet engines are generally very demanding of accurate fuel flows during startling and throttling transients. This high sensitivity results in engines that have poor response performance or engines that will flameout when undergoing a sharp transient. Because of the nature of how fuel control algorithms are configured, combustor-related fuel limits are frequently called upon to override a calculated fuel signal. It is when these fuel limits are called upon, such as nearing combustor saturation, that an accurately calibrated fuel servo becomes a necessity. There is a direct correlation between fuel flow at a particular condition and the acceleration one could expect in return. When the characteristic of an engine is described in terms of acceleration instead of fuel flow, the characteristic of the fuel servo loses its importance.

In the illustrated embodiment of the invention, the control block 80 calculates a product of an acceleration limit with an equation for cutting back on the acceleration limit as the speed error approaches zero. Acceleration varies exponentially with engine speed, linearly with temperature and logarithmically with pressure. A single expression for the acceleration limit is obtained by multiplying the three independent equations together, and solving for a constant of proportionality necessary to satisfy the acceleration of the engine at the reference states. The following expression represents the positive engine acceleration limit:

$$\dot{N}_{limit}\{\%/s\} = 0.001025[\exp(0.018\ N\ \{\%\})p^{1.62}\{psia\}(134 - T\ \{F\})] \quad \text{Equation 1}$$

In the above equation, and as described below, the variable N represents speed, the variable $\dot{N}$ represents acceleration, the variable P represents pressure and the variable T represents temperature. The same process is carried out characterizing the deceleration limit of the engine.

The calculated acceleration limit is one that never exceeds the engine's operational limits. It follows that controlling the engine to track its maximum acceleration capability provides the optimum throttling response of the engine. However, since the steady state engine speed is not exactly equal to the desired speed, it is not desirable to have the acceleration control function like a comparator. Instead, an exponential function is used providing a weighted acceleration setpoint to track when the speed error approaches small values. This function is described with the following equation:

$$\dot{N}_{desired} = \frac{\Delta N}{|\Delta N|} \dot{N}_{limit}\left[1 - \exp\left(-K\frac{|\Delta N|}{\dot{N}_{desired}}\right)\right] \quad \text{EQUATION 2}$$

Where K is a constant which determines the "tightness" of the acceleration limit and the coefficient on $\dot{N}_{limit}$ assigns the proper sign to the setpoint.

The above two equations 1 and 2 are multiplied in the control block 80 to develop the desired acceleration signal on the line 82.

The acceleration control function 66 includes a derivative block 84 which receives the speed feedforward signal on the line 70. The derivative block 84 takes the derivative of the speed signal to develop an acceleration feed forward signal on a line 86 representing actual engine acceleration. The acceleration signal on the line 86 is filtered at a block 88 to develop a filtered acceleration feedforward signal on a line 90 which is input to a second summer 92. The second summer 92 also receives the acceleration setpoint signal on the line 82. The second summer 92 calculates an acceleration error signal on a line 94 representing a difference between desired engine acceleration and actual engine acceleration. The acceleration error signal on the line 94 is input to a proportional integral (PI) control block 96. The PI control block 96 implements a conventional proportional and integral algorithm to minimize the error and develop a control output on a line 98. The control block 96 may or may not include adaptive gain functions, as necessary or desired. The PI algorithm implemented in the control block 96 may be represented by the following difference equation:

$$MA_K = MA_{k-1} + \left[K_P + \frac{K_I T}{2}\right]\Delta\dot{N}_K + \left[\frac{K_I T}{2} - K_P\right]\Delta\dot{N}_{k-1} \quad \text{(EQUATION 3)}$$

Where $K_P$ is proportional gain and $K_I$ is integral gain. In this application the time step T is ten milliseconds. The subscript "k" represents the current reading while "k−1" represents the previous reading. Each gain factor is a function of speed, pressure and temperature. In the illustrated embodiment of the invention, these constants are determined in accordance with the following equations:

$$K_p = 0.5/[(K_v)\ (kf)\ (\partial N/\partial Wf)] \quad \text{EQUATION 4}$$

$$K_i = 0.5\ (Wfo/No)/[(kv)\ (Kf)] \quad \text{EQUATION 5}$$

$$K_f = [(100\%\ rpm)\ (n)\ (10\ Volts)]/[(60)\ (25,000)\ (100\%\ N)] \quad \text{EQUATION 6}$$

The variable $W_f$ represents fuel flow. The variable $W_{of}$ represents steady state fuel flow. The variable $N_o$ represents steady state speed. $K_v$ represents an approximate slope of a fuel flow rate/milliamp curve for the fuel servo. The variable $K_f$ is a constant related to response of the frequency to voltage converter 58 as shown in equation 6. The variable n represents the number of gear teeth on the shaft. 10 volts represents the voltage for a 0–10 volt converter. 25,000 is the maximum frequency range of the converter module 58. Obtaining both $W_{fo}/N_o$ and $\partial N/\partial W_f$ are done in much the same manner in which engine acceleration limits were determined. The resulting expression for each is the product of three curve fitted equations, with a constant in front of the three variable expression. By updating these values in the controller, and using equations 4 and 5 to vary control gains, the engine 14 can adapt to its own environment and engine speed, thus providing consistent and optimal throttling response.

The control output on the line 98 is input to a filter 100 with the filtered signal on the line 102 being input to a current amplifier circuit 104. The current amplifier circuit 104 is an analog circuit which converts a zero to ten volt signal to form the current command signal on the line 46. Particularly, this current signal controls operation of the fuel servo valve to control combustion in the engine 14.

Thus, in accordance with the invention a closed loop acceleration control 66 is used to develop a control output signal on a line 46 for controlling combustion in the engine 14. This fuel control system 12 provides consistent and optimal control of the engine 14. The implementation of the described control approach eliminates the need to calibrate and program the fuel/current relationship of the fuel servo valve 44. This not only reduces costs but also increases robustness of the control system.

The filters 88 and 100 may be, for example, a second order Butterworth filter with a corner frequency of 10 Hz or that appropriate to suit the given engine. The filter 68 performs two steps. It averages two hundred speed samples every fifty microseconds, followed by the Butterworth filter.

Although the acceleration control block 96 is illustrated using proportional and integral control, other control schemes for implementing closed loop control could also be used, as will be apparent to those skilled in the art. Indeed, it is a principal object of the invention to control the fuel servo valve based on an acceleration error signal, rather than the conventional speed error signal.

I claim:

1. A control system for a gas turbine engine having a fuel servo valve controlling the flow of fuel to the engine combustor wherein operation of said fuel servo valve is controlled by engine acceleration error according to an apparatus comprising:

means for sensing engine speed and providing first signals indicative of that speed;

a source of second signals, indicating the desired engine speed;

means for creating acceleration set point signals from said first and second signals;

means for taking the derivative of said first signals to determine actual engine acceleration and generating third signals indicative of that acceleration, including means for digital filtering of said first signals before taking the derivative and said third signals after taking the derivative in order to reduce errors in said third signals;

means for creating acceleration error signals from said acceleration set point signals and said third signals; and means for applying control signals to said fuel servo valve which are a function of said acceleration error signals.

2. The control system according to claim 1 wherein means are provided for receiving said acceleration error signals and modifying those signals at least in part according to environmental pressure and temperature in order to create said control signals.

* * * * *